Aug. 25, 1925.  
E. L. TOWLE  
1,550,717  
RATE CONTROL VALVE  
Filed Oct. 25, 1923    2 Sheets-Sheet 1
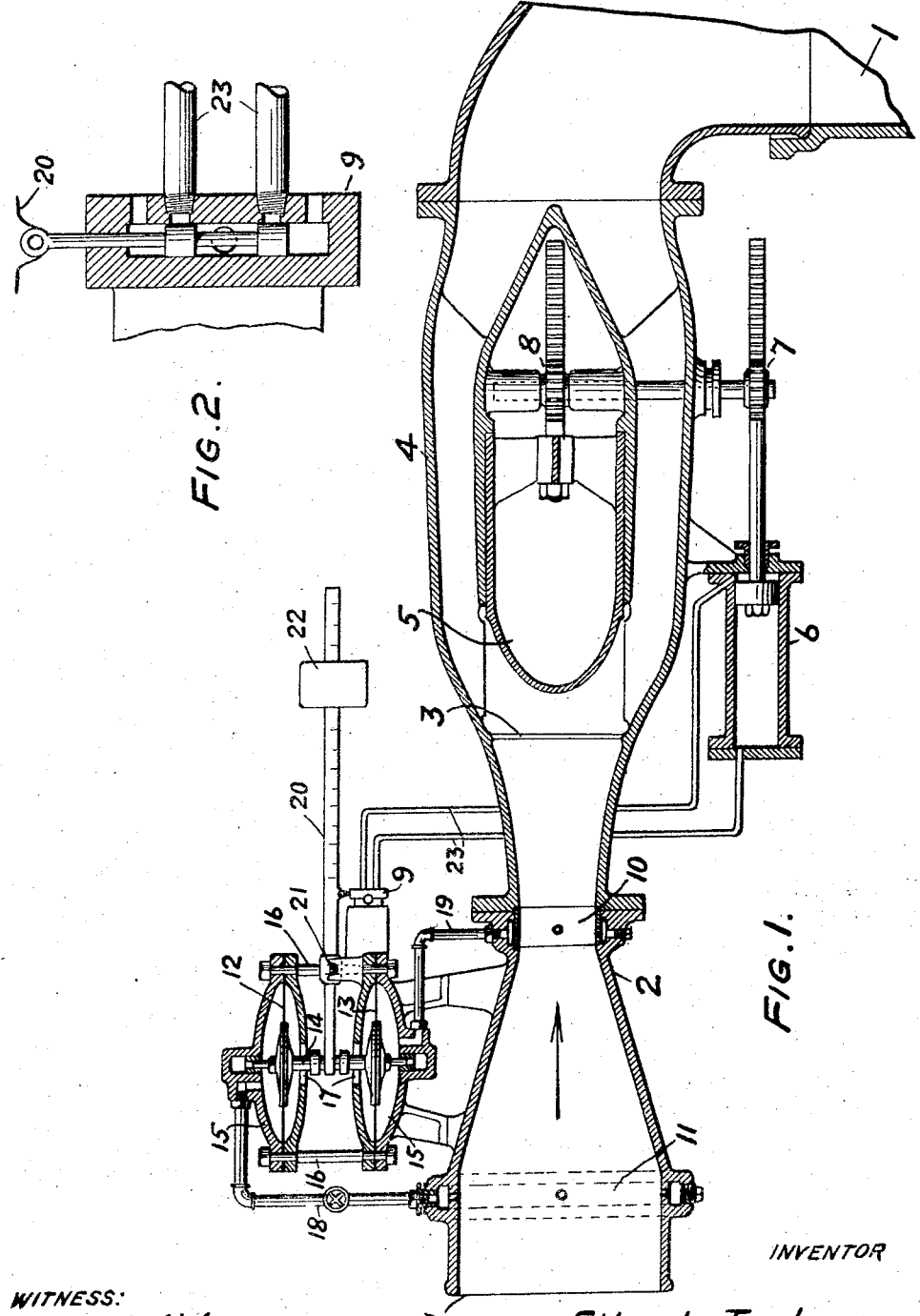
INVENTOR  
Elton L. Towle  
BY Augustus B. Stoughton  
ATTORNEY.

Aug. 25, 1925.
E. L. TOWLE
1,550,717
RATE CONTROL VALVE
Filed Oct. 25, 1923     2 Sheets—Sheet 2
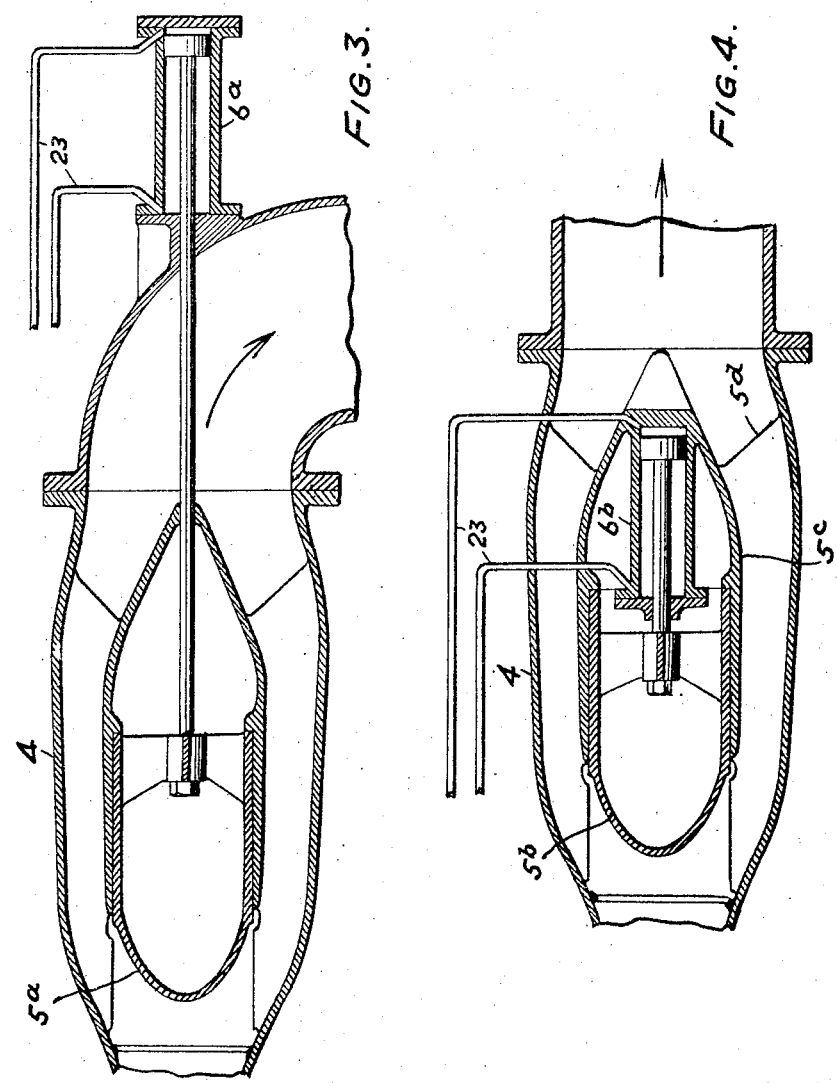
INVENTOR
Elton L. Towle
BY
Augustus B. Stoughton
ATTORNEY.

1,550,717

UNITED STATES PATENT OFFICE.

ELTON L. TOWLE, OF PATERSON, NEW JERSEY.

RATE-CONTROL VALVE.

Application filed October 25, 1923. Serial No. 670,789.

*To all whom it may concern:*

Be it known that I, ELTON L. TOWLE, a citizen of the United States, residing at Paterson, in the county of Passaic and State of New Jersey, have invented new and useful Improvements in Rate-Control Valves, of which the following is a specification.

This invention relates to rate control valves of the type employing a differential pressure to adjust the rate of flow to predetermined amounts or capacities.

One object of the present invention is to provide a rate control valve in which there will be a minimum loss of hydraulic head in the fluid passing through the valve, which will be positive in its action, which is inexpensive to operate, and which combines with the above mentioned advantages a positive shut-off or stop valve. Another object of the invention is to minimize the effect of friction and to make the valve sensitive and accurate.

The invention will be claimed at the end hereof but will be first described in connection with the embodiment of it chosen for illustration in the accompanying drawings forming part hereof and in which—

Figure 1 is a view principally in central section illustrating a rate control valve embodying features of the invention.

Fig. 2 is a similar view of the pilot valve shown in Figure 1 but drawn to an enlarged scale, and Figs. 3 and 4 are central sectional views illustrating modifications of the valve.

In the drawings 1 is a fluid conduit in which the fluid may be subjected to comparatively low yet varying head. 2 is a Venturi tube having its outlet end adapted to form a valve seat 3 and a valve body 4, and the Venturi tube is interposed in the conduit 1. 5 is a needle type of valve pointing upstream, located in the valve body and arranged to co-operate with the valve seat 3 in various positions to provide an annular water way proportioned in respect to the head. There is a power device for positioning the valve 5. As shown it consists of a piston and cylinder 6 connected by rack and pinion mechanism 7 and 8 with the valve 5 and actuated by motive fluid controlled by the pilot valve 9. There is a balanced diaphragm control responsive to the difference in pressure between the throat 10 and the inlet end 11 of the venturi, and it is adapted to control the pilot valve 9 and therefore the power device. 12 and 13 are opposed diaphragms interconnected by the rod 14. These diaphragms are arranged in diaphragm chambers 15 shown as connected by bolts 16. The rod 14 is guided by these chambers but is free for movement in respect thereto by the provision of openings 17. To one side of the diaphragm 12 is introduced fluid pressure from the entrance of the Venturi tube by the connection 18, and fluid pressure to the opposing diaphragm 13 is introduced by the connection 19 from the throat of the venturi. The greater fluid pressure through the connection 18 creates an unbalanced condition on the diaphragm 13 which unbalanced condition is restrained by the lever 20 pivoted at 21 and by the weight 22 adjustable on the lever. A condition of equilibrium will exist when the position of the weight 22 on the lever arm 20 will just balance the differential thrust due to the fluid differential. The lever arm 20 is connected with and operates the pilot valve 9. Departure from the differential pressure on the double diaphragm device for which it is set, causing movement of the lever 20, operates the pilot valve which controls the connections 23 to the power device 6, so that the latter shifts the needle valve 5 appropriately for maintaining a constant rate of flow. It may be remarked that the needle type of valve 5 in co-operation with the balanced double diaphragm control provides that the rate control valve shall operate satisfactorily under even comparatively low heads such as are encountered in filter bed work for reasons among which may be mentioned the comparative absence of friction such as is incident to the use of stuffing boxes and the slight loss of head at the valve 5. In Fig. 3 the piston and cylinder $6^a$ are directly connected with the needle type of valve $5^a$ and are arranged co-axially with it. In Fig. 4 the piston and cylinder $6^b$ are arranged within the needle type of valve and are interposed between the movable part $5^b$ and the fixed part $5^c$, carried by ribs $5^d$ extending inward radially from the valve body 4. The construction and mode of operation of the modification shown in Figs. 3 and 4 are as above described with reference to Figure 1.

It will be obvious to those skilled in the art to which the invention relates that modifications may be made in details of construction and mere matters of form without departing from the spirit of the invention which is not limited as to those matters or otherwise than the prior art and the appended claim may require.

I claim:

A constant flow device structure comprising in combination a fluid conduit, a Venturi tube having its outlet end adapted to form a valve seat and a valve body and interposed in said conduit, a needle type of valve pointing upstream in said body and arranged to co-operate with said seat in various positions to provide an annular water way proportioned in respect to the head, a power device for positioning said valve, and a balanced double diaphragm control responsive to the differential pressure between the throat and inlet end of the venturi and adapted to control the power device.

ELTON L. TOWLE.